United States Patent Office 3,513,352
Patented May 19, 1970

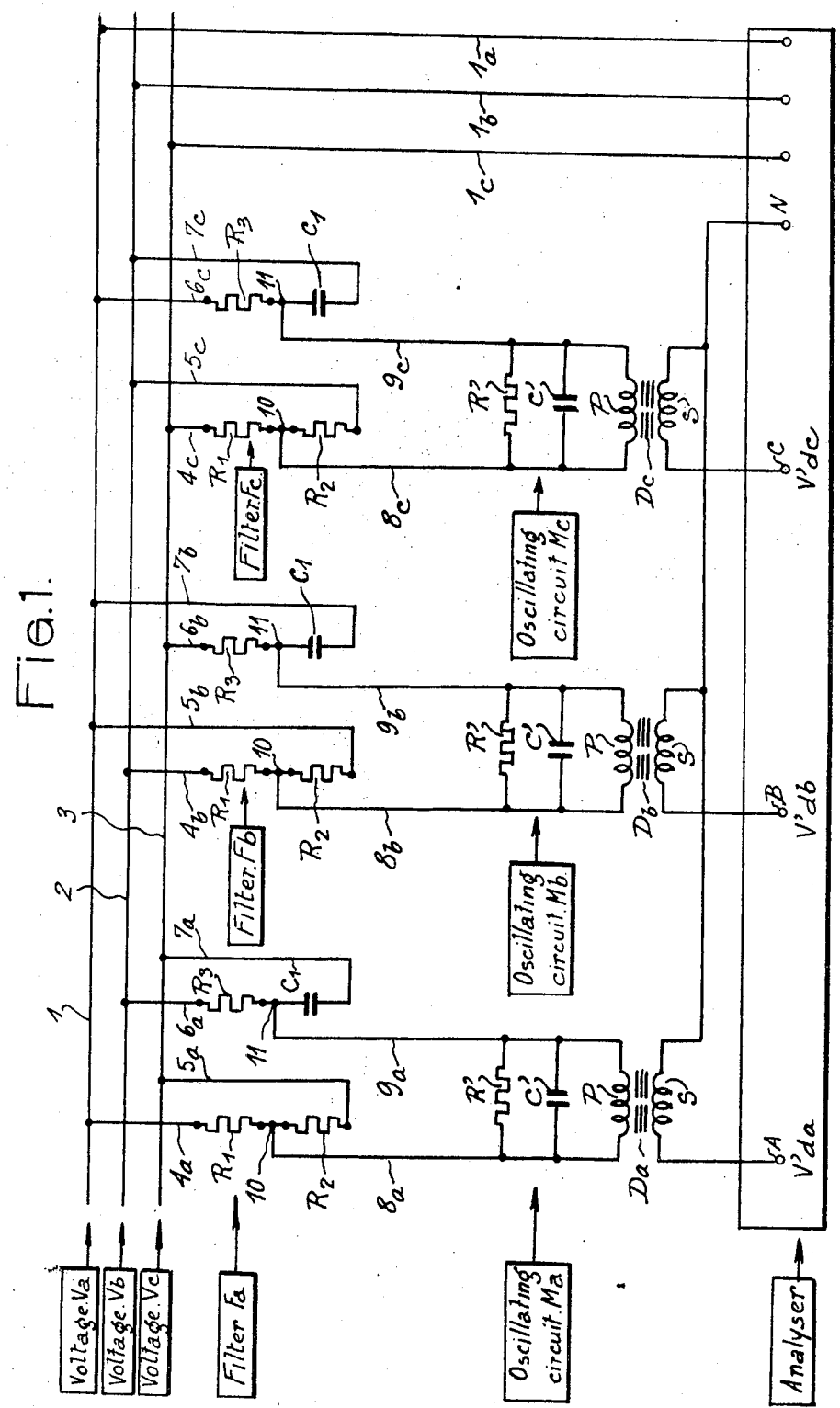

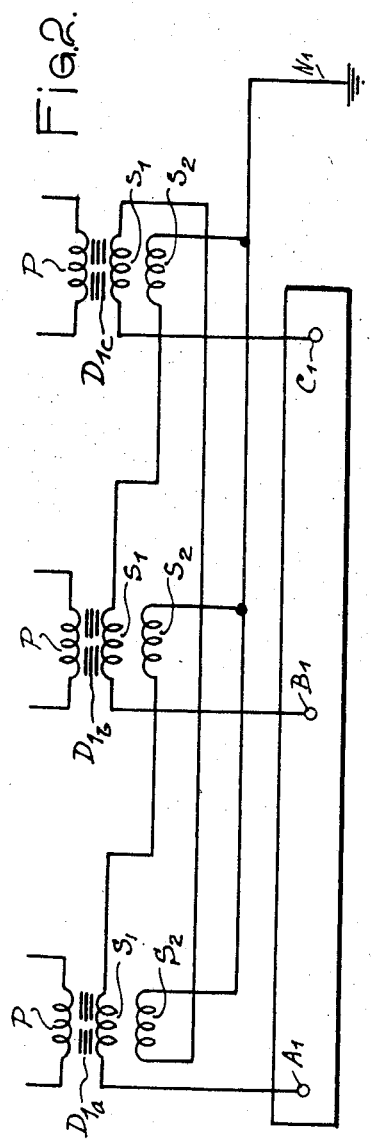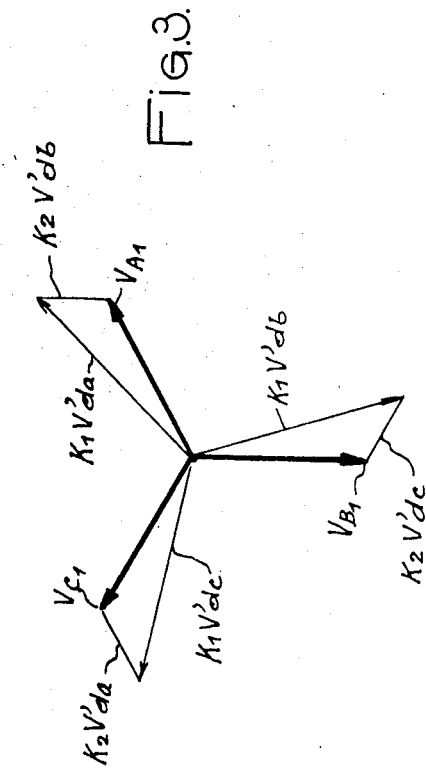

3,513,352
DEVICES FOR PROTECTING THREE-PHASED ELECTRIC LINES
Michel Henry Pierre Souillard, Fontenay-Aux-Roses, France, assignor to Compagnie des Compteurs, Paris, France, a company of France
Filed Apr. 22, 1968, Ser. No. 723,174
Claims priority, application France, May 3, 1967, 105,001
Int. Cl. H02h 3/26, 1/04
U.S. Cl. 317—27    5 Claims

ABSTRACT OF THE DISCLOSURE

The device for temporarily memorising the direct components of the voltages of a polyphase network for detecting faults of this network comprises as many filters as there are phases of the network and respectively supplying the direct component of the voltage belonging to each phase, oscillating circuits being electrically connected to said filters and comprising a mutual inductance having at least one secondary winding and one at least of said secondary windings being electrically connected to one of the secondary windings of the other mutual inductances in a star-pattern connection.

---

In protecting devices for polyphase electric lines, three-phase for instance, utilizing directional elements and elements for measuring the distance of a defect in relation to the position of protecting devices, it is very often necessary to utilize an electric magnitude whose phase acts as reference in relation to the phase of other electric magnitudes affected by the defect. In this case, it is indispensable that the electric magnitude, the phase of which is used for reference, and which, when there is a defect, may disappear or whose value distinctly lowers, temporarily persists so that the working of the protection can be correctly ensured.

Another object of the invention consists of obtaining adjustable but known phase displacements between balanced compound voltages and the direct components of the network without the necessity of providing out phase networks capable of introducing errors into measurements made at the time of a fault.

For obtaining this result, according to the invention, the direct components of voltages are used which are obtained, from voltages between phases of the network to be protected by means of filters, and the output terminals of each of these filters is connected to an oscillating circuit tuned to the frequency of the network, this oscillating circuit following a fault retains during the time that its oscillations last the memory of the phase of the direct components of the voltage.

In the event of the appearance of a dissymmetric fault, the most characteristic electric magnitude of the voltages of the network is actually the direct component of the voltages whose amplitude diminishes, but whose phase remains practically unvarying in relation to a balanced three-phase system of voltages at the measuring point, before the appearance of the fault. Moreover, the influence of the transitory system pertinent to the filters of the direct components of the voltages is practically eliminated following the inertia occurring in the oscillating circuits which thus ensure, after the appearance of a fault, the temporary persisting of these electric magnitudes.

FIG. 1 is a diagram of a method of embodiment of the object of the invention.

FIG. 2 is a diagram showing a complementary development of the invention.

FIG. 3 is a vectorial diagram showing electrical phenomena obtained by the diagram of FIG. 2.

In FIG. 1, the reference numerals 1, 2 and 3 respectively designate the three phase conductors of a three-phase network. The instantaneous voltages of the above-mentioned three phases are respectively designated by the letters $Va$, $Vb$ and $Vc$.

In the example shown, the phase conductors 1 and 3 are joined by electric conductors $4a$ and $5a$ to two resistances $R_1$ and $R_2$; the phase conductors 2 and 1 are joined by electric conductors $4b$ and $5b$ to two resistances also designated by $R_1$ and $R_2$ and the phase conductors 3 and 2 are joined by electric conductors $4c$ and $5c$ also to resistances $R_1$ and $R_2$. The resistances $R_1$ and $R_2$ of the above-mentioned circuits are in series.

In like manner, the phase conductors 2 and 3 are joined by electric conductors $6a$, $7a$ to a resistance $R_3$ and a condenser $C_1$ arranged in series with each other; the phase conductors 3 and 1 are joined by electric conductors $6b$, $7b$ also to a resistance $R_3$ and a condenser $C_1$ placed in series with each other and the phase conductors 1 and 2 are also joined by electric conductors $6c$, $7c$ also to a resistance $R_3$ and a condenser $C_1$ arranged in series one with the other.

The various resistances and condensers of the circuits described above form three filters of direct components of voltages $Va$, $Vb$ and $Vc$, filters which are designated respectively on the whole by reference numerals $Fa$, $Fb$ and $Fc$. These three filters are all identical and that is why the resistances and condenser of each of them are designated by the same letters $R_1$, $R_2$, $R_3$ and $C_1$.

As can be seen from the foregoing and the drawing, the filters $Fa$, $Fb$ and $Fc$ are in fact each three inputs able respectively to be defined by the elements of the filters; they are directly connected, namely:

Input $R_1$

Input $R_3$

Input $R_2C_1$

If we consider the method of supply resulting from the described lead of the three above-mentioned inputs of each of the filters $Fa$, $Fb$, $Fc$, we see that the voltages $Va$, $Vb$ and $Vc$ are cyclically switched in relation to each of the inputs of the three filters. Actually:

| Filters | $Fa$ | $Fb$ | $Fc$ |
|---|---|---|---|
| Input ($R_1$) | $Va$ | $Vb$ | $Vc$ |
| Input ($R_3$) | $Vb$ | $Vc$ | $Va$ |
| Input ($R_2C_1$) | $Vc$ | $Va$ | $Vb$ |

The conductors $8a$, $9a$; $8b$, $9b$ and $8c$, $9c$ are branched to the output terminals 10 and 11 of each of the filters $Fa$, $Fb$ and $Fc$, i.e. on the one hand, between the resistances $R_1$ and $R_2$ and, on the other, between the resistance $R_3$ and the condenser $C_1$ of each of the filters. The conductors $8a$, $9a$; $8b$, $9b$ and $8c$, $9c$ are respectively connected to oscillating circuits $Ma$, $Mb$ and $Mc$ which are shown as having each a damping resistance $R'$, a condenser $C'$ and a primary winding P of mutual inductances $Da$, $Db$ and $Dc$. The primary winding P and the condenser $C'$ of each oscillating circuit $Ma$, $Mb$ and $Mc$ are tuned to the frequency of the network formed by the phase conductors 1, 2 and 3. The mutual inductances $Da$, $Db$ and $Dc$ each comprise a secondary winding S which is connected, on the one hand, to one end of a common conductor N formed by a neutral conductor, and on the other hand, to terminals A, B and C, so that said secondary windings S are in star-connection.

On account of the connection described above, it is possible to collect at the terminals A, B and C three-phase voltages V'da, V'db and V'dc which are in a way, the memory of the direct components Vda, Vdb and Vdc coming from the filters Fa, Fb and Fc and thus from the voltages Va, Vb and Vc of the conductors 1, 2 and 3.

The device thus keeps in memory the direct components of the three-phase network as long as the oscillations of the oscillating circuits Ma, Mb and Mc last. By providing as shown in FIG. 1, an analysing device which can, for instance, by a phase comparator device or a calculator or any other known appliance in the technique of detecting line faults and by connecting this device, on the one hand, to the terminals A, B and C at which appear the memory voltages V'da, V'db and V'dc, and on the other hand, at the phase conductors 1, 2, 3, by conductors 1a, 1b and 1c, we compare, for instance, the voltages at the moment when the fault appears at the voltages retained in the memory.

In FIG. 2, one designates by $D_{1a}$, $D_{1b}$ and $D_{1c}$ mutual inductances whose primary P forms part, as in FIG. 1, of oscillating circuits Ma, Mb and Mc. Each mutual inductance comprises at least two secondary windings $S_1$ and $S_2$ of which the number of turns is different. It is obvious that a single secondary winding can also be provided, but in this case, it comprises at least two output plugs different.

By referring to FIG. 2, we see that one of the ends of the secondaries $S_1$ of the three mutual inductances is respectively connected to three terminals $A_1$, $B_1$ and $C_1$. The other end of the secondary $S_1$ of the mutual inductance $D_{1a}$ is connected to one of the terminals of the secondary winding $S_2$ of the mutual inductance $D_{1b}$ whose other terminal is connected to a neutral wire $N_1$. In like manner, the free terminal of the secondary $S_1$ of the mutual inductance $D_{1b}$ is connected to one of the terminals of the secondary $S_2$ of the mutual inductance $D_{1c}$ whose other terminal is also connected to a neutral wire $N_1$. Moreover, the free terminal of the secondary $S_1$ of the mutual inductance $D_{1c}$ is connected to a terminal of the secondary $S_2$ of the mutual inductance $D_{1a}$ whose other terminal is connected to the neutral wire $N_1$.

It results from the method of branching described in the foregoing, that one obtains at the terminals of the secondaries $S_1$ of the three mutual inductances, respectively voltages $K_1V'da$, $K_1V'db$ and $K_1V'dc$, $K_1$ designating a proportionality factor depending on the number of turns of the secondary winding $S_1$ and da, db and dc showing that it refers to direct components of voltages Va, Vb and Vc of the conductors 1, 2 and 3 of FIG. 1. In like manner, at the terminals of the secondary windings $S_2$ we respectively obtain voltages $K_2V'da$, $K_2V'db$ and $K_2V'dc$.

FIG. 3 shows vectorially the voltages obtained as explained above at the terminals of the secondaries $S_1$ and $S_2$. This figure shows the compound voltages resulting which are obtained at the terminals $A_1$, $B_1$ and $C_1$, voltages which are consequently of the form:

$$V_{A1} = K_1V'da + K_2V'db$$
$$V_{B1} = K_1V'db + K_2V'dc$$
$$V_{C1} = K_1V'dc + K_2V'da$$

FIG. 3 also shows that the embodiment according to FIG. 2 always enables a system to be obtained of balanced voltages even in the case of a fault on the line as long as the oscillations of the circuits Ma, Mb and Mc last, voltages which it is possible to make turn by varying the coefficients $K_1$ and/or $K_2$ so that the connection of FIG. 2 associated with the embodiment described with reference to FIG. 1 forms an outphasing network which enables the comparison of the phase of direct voltages V'da, V'db and V'dc applied to the analyser of FIG. 1 to the phases of the compound voltages $V_{A1}$, $V_{B1}$ and $V_{C1}$ and thus to show the characteristics of a fault when it appears. The terminals $A_1$, $B_1$ and $C_1$ are also connected to the analyser of FIG. 1. In actual practice, it is the mutual inductances Da, Db and Dc which are alone used but said inductances comprise at least three secondary windings, namely, the windings S of FIG. 1 and the windings $S_1$ and $S_2$ of FIG. 2.

The invention is not restricted to the embodiment, shown and described in detail, for various modifications can be applied to it without going outside its scope.

I claim:

1. Device for temporarily memorising the direct components of the voltages of a polyphase network of transport of electric energy in a device for detecting faults of this network, comprising as many filters as there are phases of the network, said filters being respectively connected to said phases according to a cyclic switching so that these filters show respectively the direct component of the voltage belonging to each phase; as many oscillating circuits as there are phases of the network, said oscillating circuits being electrically connected to said filters at the parts of the latter showing the direct component of the voltage of each phase, said oscillating circuits each comprising a mutual inductance having at least one secondary winding and at least one of said secondary windings of said mutual inductances being electrically connected to one of the secondary windings of the other mutual inductances in a star-pattern connection, so that direct voltages are produced in said secondary windings and that these direct voltages remain balanced as long as said oscillating circuits are in oscillation after the appearance of the fault on the network.

2. Device according to claim 1 in which each oscillating circuit is tuned at the frequency of the network.

3. Device according to claim 1 in which it is supplementarily provided associated with the mutual inductance of each of the oscillating circuits at least a first and second secondary winding mutually connected in star-pattern, the first secondary winding of the first oscillating circuit being connected with the second winding of the second oscillating circuit, the first winding of the second oscillating circuit being connected to the second winding of the third oscillating circuit and so on, the first winding of the last oscillating circuit being connected to the second winding of the first circuit so that compound voltages occur, and by vectorial combination, known phase changes between said direct voltages of the network and said compound voltages.

4. Device according to claim 3 in which said first windings have all the same number of turns and said second windings also the same number of turns between them.

5. Device according to claim 3 in which said mutual inductances each comprise a primary winding forming part of an oscillating circuit and at least three secondary windings of which one shows said direct voltages and of which the two others respectively form said first and second windings.

References Cited

UNITED STATES PATENTS 3,157,826 11/1964 Norton _____ 317—31 X
3,210,606 10/1965 Calhoun _____ 317—27 X
3,277,345 10/1966 Waldron _____ 317—27 X JAMES D. TRAMMELL, Primary Examiner U.S. Cl. X.R.

317—31, 36, 49, 53